US010349057B2

United States Patent
Finkelstein et al.

(10) Patent No.: US 10,349,057 B2
(45) Date of Patent: Jul. 9, 2019

(54) SYSTEMS AND METHODS FOR OPTIMIZING VIDEO CODING EFFICIENCY BASED ON CHARACTERISTICS OF VIDEO CONTENT

(71) Applicant: COX COMMUNICATIONS, INC., Atlanta, GA (US)

(72) Inventors: Jeffrey L. Finkelstein, Atlanta, GA (US); John Civiletto, Atlanta, GA (US); Benny K. Bing, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 31 days.

(21) Appl. No.: 14/676,166

(22) Filed: Apr. 1, 2015

(65) Prior Publication Data

US 2016/0295224 A1    Oct. 6, 2016

(51) Int. Cl.
  *H04N 19/103*    (2014.01)
  *H04N 19/177*    (2014.01)
  *H04N 19/142*    (2014.01)
  *H04N 19/172*    (2014.01)
  *H04N 19/107*    (2014.01)
  *H04N 19/146*    (2014.01)

(52) U.S. Cl.
  CPC ......... *H04N 19/142* (2014.11); *H04N 19/107* (2014.11); *H04N 19/146* (2014.11); *H04N 19/172* (2014.11)

(58) Field of Classification Search
  CPC .. H04N 19/503; H04N 19/142; H04N 19/172; H04N 19/33
  See application file for complete search history.

(56) References Cited

U.S. PATENT DOCUMENTS

| | | | | |
|---|---|---|---|---|
| 6,763,067 B2* | 7/2004 | Hurst | ............... | H04N 21/23406 375/240.03 |
| 8,095,955 B2* | 1/2012 | Hardacker | ........... | H04N 19/172 725/95 |
| 8,169,497 B2* | 5/2012 | Wan | .................... | G06K 9/00711 348/222.1 |
| 8,553,769 B2* | 10/2013 | He | ......................... | H04N 19/33 375/240.12 |
| 8,577,159 B2* | 11/2013 | Yu | ......................... | H04N 19/147 382/232 |
| 8,798,150 B2* | 8/2014 | Hegde | ................ | H04N 21/6437 375/240.02 |

(Continued)

*Primary Examiner* — Sathyanaraya V Perungavoor
*Assistant Examiner* — Philip P. Dang
(74) *Attorney, Agent, or Firm* — Eversheds Sutherland (US) LLP

(57) ABSTRACT

Certain embodiments herein relate to optimizing the efficiency of video coding. Such optimization may be based on characteristics of video content, such as the size and type of video frames. The size of video frames may be compared to a threshold size to determine whether an intracoded frame should be inserted into a Group of Pictures (GOP) instead of a predetermined type of video frame. As an example, an intracoded video frame may be inserted into the GOP when an abrupt or gradual size change in the sequence of video frames is determined. As another example, unipredicted frames may also be inserted into the GOP instead of bipredicted frames using a similar comparison.

15 Claims, 5 Drawing Sheets

(56) References Cited

U.S. PATENT DOCUMENTS

| | | | |
|---|---|---|---|
| 8,893,207 B2* | 11/2014 | Perlman | A63F 13/12 |
| | | | 725/116 |
| 2006/0233237 A1* | 10/2006 | Lu | H04N 19/176 |
| | | | 375/240.03 |
| 2010/0021128 A1* | 1/2010 | Goudar | H04N 5/783 |
| | | | 386/345 |
| 2010/0104009 A1* | 4/2010 | Hardacker | H04N 19/172 |
| | | | 375/240.12 |
| 2010/0296579 A1* | 11/2010 | Panchal | H04N 19/172 |
| | | | 375/240.15 |
| 2013/0002898 A1* | 1/2013 | Tian | H04N 5/225 |
| | | | 348/222.1 |
| 2013/0070842 A1* | 3/2013 | Gordon | H04N 19/159 |
| | | | 375/240.02 |
| 2013/0166580 A1* | 6/2013 | Maharajh | H04L 65/605 |
| | | | 707/758 |
| 2015/0003530 A1* | 1/2015 | Gao | H04N 17/004 |
| | | | 375/240.15 |

* cited by examiner

SYSTEMS AND METHODS FOR OPTIMIZING VIDEO CODING EFFICIENCY BASED ON CHARACTERISTICS OF VIDEO CONTENT

Video content may be compressed using various coding techniques. These coding techniques may code frames representing the video content in a group of pictures (GOP). Unfortunately, existing techniques may implement a fixed GOP in which a preset number of certain types of coded frames may be used. Coding techniques that employ such a preset number may ignore opportunities to more selectively determine a type of coded frame. Existing coding techniques may also rely upon an assumption that certain types of coded frames are more efficient than other types. The above limitations of existing coding techniques may lead to, among other deficiencies, excessively large, inefficiently coded video content, which may adversely affect the viewing experience of users of the video content.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein relate to, among other things, optimizing the efficiency of video coding based on characteristics of video content. Video content, such as movies, television shows, etc., may be represented in video frames. The video frames may be stored in a sequence according to the various scenes that occur in the video content. Certain embodiments herein relate to identifying characteristics of the video frames that may indicate scene changes between the video frames, and hence, an opportunity to more optimally code the video frames. Optimally coding the video frames as used herein may refer to the process of generating a Group of Pictures (GOP) in an open or flexible fashion such that intracoded frames may be inserted into the GOP when the video content may need them, as opposed to inserting a predetermined number of intracoded frames irrespective of the video content (e.g., a closed GOP). Unipredicted frames may also be inserted into the GOP instead of bipredicted frames as part of optimizing video coding efficiency, in some embodiments.

Characteristics of the video frames that may be used to optimally code the video frames may include the size and type (e.g., video coding type) of the video frames. In an example embodiment, the size of the video frames in a sequence may be compared to one another to determine whether a change in size between the video frames is abrupt (e.g., a relatively high and sudden change in size) or gradual (e.g., a relatively low and steadily increasing change in size). Whether a size change is abrupt or gradual may depend on whether the size of the video frames exceeds a threshold size. An intracoded frame may be inserted into the GOP upon detecting such size changes. In other examples, a unipredicted frame may be inserted into the GOP instead of a bipredicted frame that follows the unipredicted frame in the sequence of video frames when the size of the bipredicted frame exceeds a threshold size. More detailed descriptions and examples of the above determinations, including systems and devices used to implement and/or facilitate the determinations, are provided below.

Figure 1:
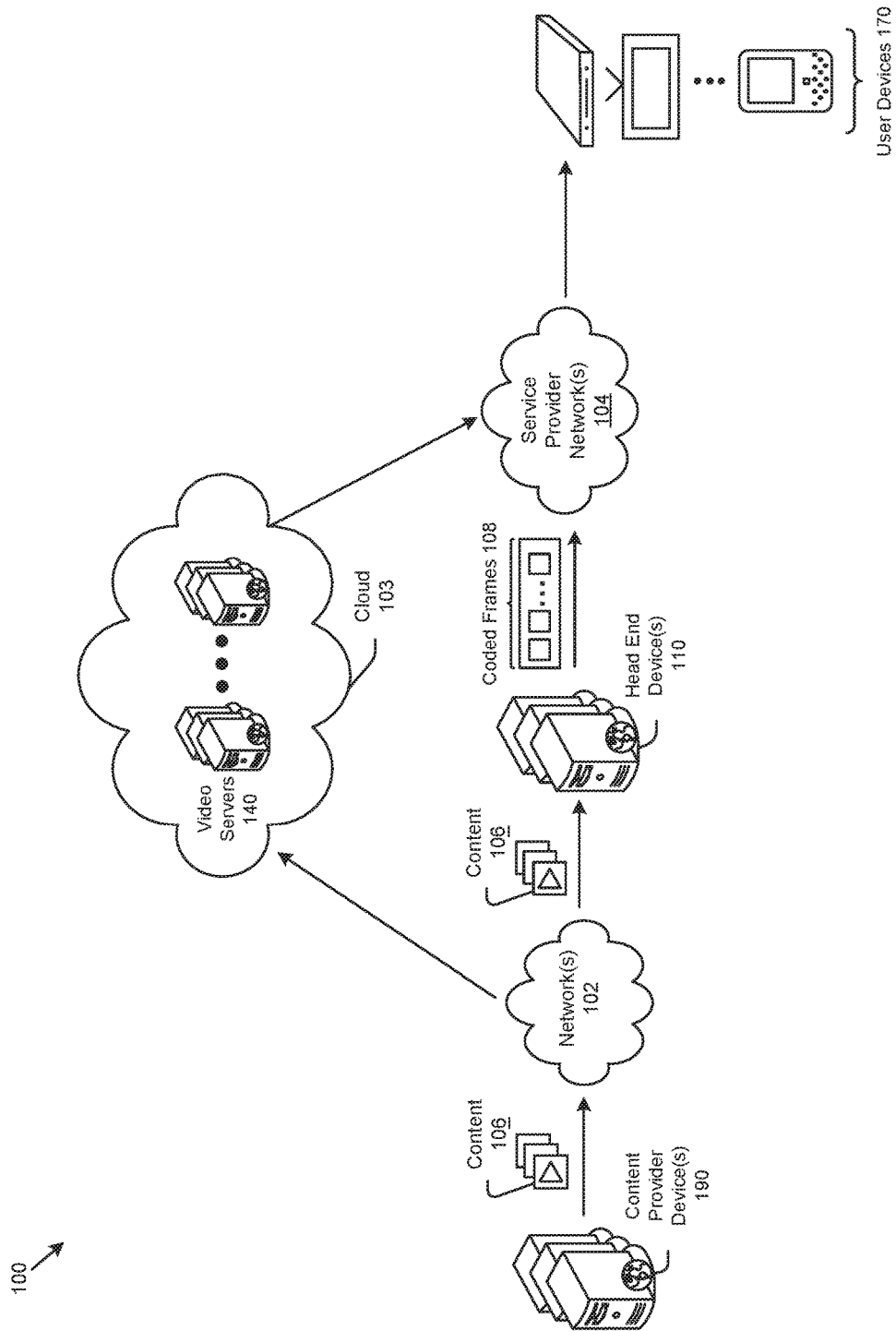
FIG. 1 illustrates a schematic diagram of network infrastructures and devices configured to implement optimized video coding efficiency based on characteristics of video, according to an embodiment of the disclosure.

FIG. 1 depicts a schematic diagram 100 of network infrastructures and devices configured to implement optimized video coding efficiency based on characteristics of video, according to an embodiment of the disclosure. The computing environment 100 may include, but is not limited to, one or more head end devices 110, video servers 140 in a cloud computing arrangement 103, user devices 170, and content provider devices 190. In one embodiment, a content provider device 190 may send content 106 to the head end device 110 and/or the video server 140 over the one or more networks 102. The head end device 110 (or the video server 140) may code the content 106 according to the techniques described herein to generate the coded frames 108, and may send the coded frames 108 over the service provider network 104 to a user device 170 at a customer premise, where the content may be accessed by a user. Such processes will be described in greater detail below.

Certain embodiments herein relate to optimizing the coding efficiency of the content 106, such as video content. While certain embodiments herein relate to video content, other embodiments may relate to audio, multimedia, text, data, or other information or broadband content that may be accessed by a user via the user devices 170. The optimally coded content 106 may be represented by the coded frames 108, which may be compressed video frames stored in a group of pictures (GOP). In this way, the GOP may include a group of successive pictures within a coded video stream, which itself may include one or more successive GOPs. Each GOP may, for example, include a certain number of frames per second or other time interval, such as sixty (60) frames per second, thirty (30) frames per second, etc.

Visible frames may be generated from the coded frames 108 and presented on a display of a user device 170, as will be described in greater detail below. The coded frames 108 may be compressed using different algorithms or techniques, which may vary according to the amount of compression of the video frames. The different algorithms and techniques may generate various types of frames such as intracoded frames and intercoded frames, among others. The coded frames 108 may therefore include intracoded and intercoded frames.

Intracoded frames may refer to video frames for which compression techniques are performed relative to information that is contained within the current frame and not relative to any other frames in a video sequence, in one implementation. An example intracoded frame may be an I-frame, which may be the least compressible but doesn't require other video frames to decode, as compared to other types of video frames. Other types of intracoded frames may also exist depending on the type of algorithm, technique, or codec, among other factors.

Intercoded frames may refer to frames in a video compression stream that are expressed in terms of one or more neighboring frames. Example types of intercoded frames may include unipredicted frames and bipredicted frames, among others. A unipredicted frame may refer to a frame that uses data from one or more previous frames for decompression. An example type of unipredicted frame may include a P-frame. A bipredicted frame may refer to a frame that uses one or more of both a previous frame and a forward frame for data reference to attain a higher amount of video compression than a unipredicted frame. An example type of a bipredicted frame may include a B-frame. Other types of unipredicted and bipredicted frames may exist depending on the type of algorithm, technique, or codec, among other factors.

Various types of network infrastructures may be used to enable communication between the devices in FIG. 1 to facilitate the processes described herein. As described above, the one or more networks 102 may be used to distribute the content 106 from the content provider device 190 to the head end device 110 and/or the video server 140. The network 102 may include any number of wired or wireless networks. Example networks may include, but are not limited to, cable networks, landline-based networks, the Internet, intranets, cellular networks, satellite networks, WiFi networks, Bluetooth® networks, and Near Field Communication (NFC) networks. The network 102 may include various devices, such as switches, routers, gateways, etc., as well as various transmission mediums, to facilitate distribution of the content 106 between the devices in FIG. 1. Some embodiments may not involve a network, and may instead provide features on one device or on devices that are directly connected to each other.

The one or more service provider networks 104 may include various devices and transmission mediums to facilitate distributing content, such as the coded frames 108 or other broadband content, from a service provider that manages the head end device 110 and/or the video server 140 to a customer premise location that includes the user devices 170. In some embodiments, the service provider network 104 may include multiple infrastructures that support various types of networks for enabling communication between the service provider and the customer premise. Example such networks may include, but are not limited to, cable networks, optical networks, hybrid fiber coaxial (HFC) networks, Passive Optical Networks (PON) (e.g., Ethernet PON or EPON, Gigabit PON or GEPON), secure PON or SPON), active optical networks (AON), digital subscriber line (DSL) networks, other landline-based networks, wireless networks, or any combination of these and/or other networks.

In one embodiment, multiple infrastructures for distributing content over the service provider network 104 may include an edge serving facility and an outside plant (not shown). Although not shown within the service provider network 104, the head end device 110, the video server 140, and at least a portion of the customer premise, which includes the user devices 170, may be considered part of the service provider network 104.

The edge serving facility may include a central office or other facility that includes various computing devices, line termination units, and other equipment that may be configured to manage communication between devices in the service provider network 104. In one embodiment, the edge serving facility may include at least a portion of the head end devices 110 and/or the video servers 140 in the cloud computing arrangement 103. The head end devices 110 may also be referred to herein as video head end devices to signify their capabilities associated with processing video content.

As described, the head end devices 110 (or the video servers 140) may receive content that originated from the content provider devices 190, such as devices associated with television networks, Internet Service Providers (ISPs), or other providers of video, audio, data, text, or other content. In one embodiment, the head end devices 110 may code the video content 106 to generate the coded frames 108, generate broadband signals or video packets that represent the coded frames 108, and send such signals or packets over the service provider network 104 to one or more devices configured to decode the coded frames 108 and present them to a user of the one or more user devices 170.

The broadband signals from the head end device 110 may be transmitted according to various formats or standards such as, but not limited to, Data Over Cable Service Interface Specification (DOCSIS), Quadrature Amplitude Modulation (QAM), Orthogonal Frequency Division Multiplexing (OFDM), Multimedia over Coax Alliance ("MoCA"), or other communication standards for wired or wireless communications supported by devices and components in the service provider network 104.

In one embodiment, the head end device 110 or the video server 140 may receive video packets representing the content 106 in the Transmission Control Protocol/Internet Protocol (TCP/IP or IP) format. The head end device 110 may convert the TCP/IP video packets to a radio frequency (RF) format for transmission to one or more of the user devices 170 at a customer premise. In one configuration, the head end device 110 may include, or otherwise be associated with, a Media Access Control (MAC) and a physical layer (PHY) that may enable the conversion and transmission of the packets. The head end device 110 may also include, or be associated with, a cable modem termination system (CMTS), which may perform at least a portion of the functionality described in association with the head end device 110.

In another embodiment, the coded frames 108 may be stored as TCP/IP packets in one or more queues associated with a customer premise, and may be converted to an RF signal for transmission to the customer premise. As an example, the video server 140 may receive TCP/IP video packets, and may distribute TCP/IP video packets (e.g., representing the coded frames 108) to one or more user devices 170 at the customer premise. Other embodiments may involve different formats for the packets, types of packets, protocols, etc.

The head end device 110 of the service provider network 104 may also manage upstream communications, such as requests for video content, from the user devices 170. The video servers 140 may perform the same or similar functions as the head end devices 110, as will be described in greater detail below.

The outside plant of the service provider network 104 may include various transport mediums, devices, and/or components configured to facilitate communication over the transport mediums. Example transport mediums may include fiber (e.g., optical), cable (e.g., coaxial cables radio frequency (RF) cables, twisted pair cables, etc.), among other transport mediums. Devices or components in the service provider network 104 may include optical splitters; taps or terminators, which may form access points from which one or more customer premise locations may be provided with broadband services via cable lines; amplifiers that may amplify a broadband signal; filters that may filter signals of varying frequencies; as well as other devices and components.

As described, a customer premise location may include various user devices 170. Example user devices may include, but are not limited to, a set-top box; a television, such as a smart television that is configured to receive, present, and/or enable a user to interact with content received over one or more networks via hardware and software configurations; a hybrid device that includes both a smart television and a set-top box; a mobile device, such as a smartphone; a cable modem; and a router that enables communication between multiple user devices 170 over a network, such as a MoCA network.

The set-top box may decode video content, such as the coded frames 108, received from the head end device 110 or the video server 140. The set-top box may also store video content, for example, in a memory buffer of the set-top box prior to sending the content to a television or other user device 170, where the content may be presented, in one embodiment. The set-top box may include one or more wired or wireless interfaces that enable it to send information to the user devices 170. In one example, the set-top box may receive video signals associated with the coded frames 108 from the head end device 110, buffer the video signals, and may thereafter decode and send the decoded video signals to a television, a mobile device, and/or a monitor for display. Numerous other configurations involving different devices and/or processes for decoding and presenting video content exist in other examples.

The above descriptions in FIG. 1 are for purposes of illustration and are not meant to be limiting. Other descriptions, examples, etc., also exist. For example, although a certain number of devices are shown in FIG. 1, fewer or more may exist in other embodiments. Also, processes described as being performed by the head end device 110 are not meant to exclude processes that may be performed by the video server 140, and vice versa. The processes described herein may be performed by either of these devices. Further, either or both of the network 102 or the service provider network 104, as well as other networks not shown, may enable communication between the devices in FIG. 1.

Figure 2:
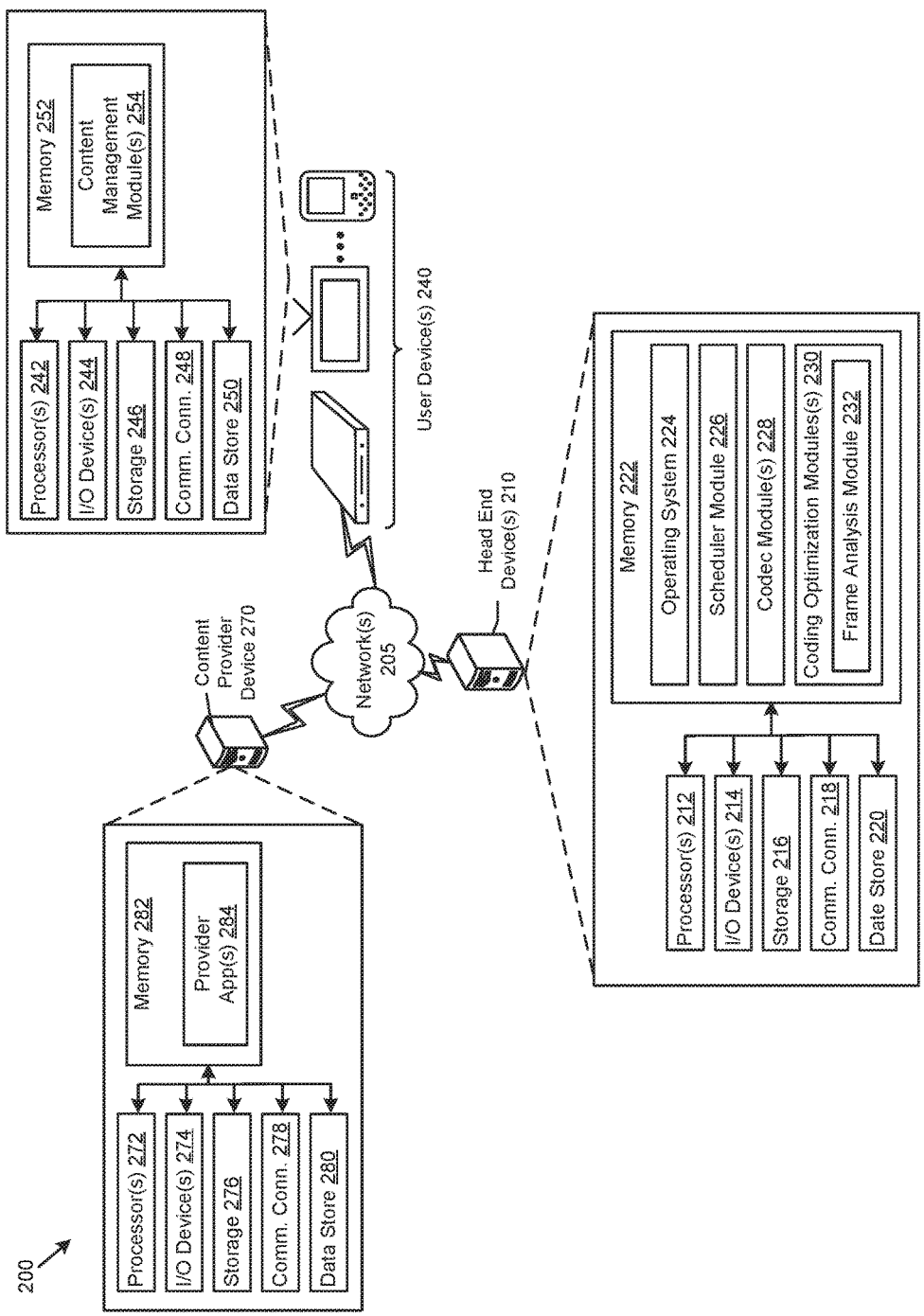
FIG. 2 illustrates a block diagram of an example computing environment for optimizing video coding efficiency based on characteristics of video content, according to an embodiment of the disclosure.

FIG. 2 depicts a block diagram of an example computing environment 200 for optimizing video coding efficiency based on characteristics of video content, according to an embodiment of the disclosure. As shown, the example computing environment 200 may include one or more head end devices 210, user devices 240, and content provider devices 270. Communication between the devices in FIG. 2 may be as described in association with FIG. 1. For example, the head end device 210 may receive video content from the content provider device 270 over the one or more networks 205, which may include the network 102 in FIG. 1. The head end device 210 may also send coded video frames (e.g., the coded frames 108) to the user devices 240 over the one or more networks 205, which may include the service provider network 104 in FIG. 1, in one example. Other types of communication between the devices in FIG. 2 or other devices may also exist in other examples. Some examples may also include a video server (e.g., the video server 140 in the cloud computing arrangement 103 in FIG. 1), which may perform the same or similar processes as those performed by the head end device 210.

As used herein, the term "device" may refer to any computing component that includes one or more processors that can be configured to execute computer-readable, computer-implemented, or computer-executable instructions. Example devices may include server farms, servers, personal computers, televisions, set-top boxes, modems (e.g., cable modems), other customer premise equipment, kiosks, smart phones, digital assistants, tablets, wearable devices, Internet appliances, application-specific circuits, microcontrollers, minicomputers, transceivers, or other processor-based devices. The execution of suitable computer-implemented instructions by one or more processors associated with various devices may form special purpose computers or other particular machines that may optimize video coding efficiency as described herein.

The head end device 210 may include one or more processors configured to communicate with one or more memory devices and various other components or devices. For example, the head end device 210 may include one or more processors 212, one or more input/output (I/O) devices 214, storage 216, one or more communication connections 218, and one or more data stores 220. The one or more processors 212 may be implemented as appropriate in hardware, software, firmware, or a combination thereof. The one or more processors 242 and 272 of the user device 240 and the content provider device 270, respectively, may be the same or at least similar to the processor 212.

The memory 222 may store program instructions that are loadable and executable on the processor 212, as well as data generated during the execution of these programs. Depending on the configuration and type of the user device 240, the memory 222 may be volatile, such as random access memory (RAM), static random access memory (SRAM), dynamic random access memory (DRAM); or non-volatile, such as read-only memory (ROM), Electrically Erasable Programmable Read-Only Memory (EEPROM), flash memory, etc. The memories 252 and 282 of the user device 240 and the content provider device 270, respectively, may be the same or at least similar to the memory 222.

The storage 216 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The storage 246 and 276 of the user device 240 and the content provider device 270, respectively, may be the same or at least similar to the storage 216.

The memories 222, 252, and 282, and the storage 216, 246, and 276, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The I/O devices 214 may enable a user to interact with the head end device 210 to perform various functions. The I/O devices 214 may include, but are not limited to, a keyboard, a mouse, a pen, a voice input device, a touch input device, a gesture detection or capture device, a display, a camera or an imaging device, speakers, and/or a printer. The I/O devices 244 and 274 of the user device 240 and the content provider device 270, respectively, may be the same or at least similar to the I/O devices 214.

The communication connections 218 may allow the head end device 210 to communicate with other devices, such as the user devices 240 and the content provider devices 270, over the one or more networks 205. In one implementation, the communication connections 218 may include one or more line cards, which may include modular circuits on a printed circuit board or other configurations. The line cards may interface with the content provider device and the service provider network (e.g., the service provider network 104 in FIG. 1) to receive video packets and transmit video packets corresponding to optimized video frames to the user devices 240, in one embodiment. The communication connections 248 and 278 of the user device 240 and the content provider device 270, respectively, may be the same or at least similar to the communication connections 218. The communication connections 248 of a set-top box may include a network interface that provides communication to display devices, such as a television, mobile device, etc., via a wired and/or wireless connection.

The one or more data stores 220 may store lists, arrays, databases, flat files, etc., that include information used to facilitate the processes described herein. In some implementations, the data store 220 may be stored in a memory external to the head end device 210 but may be accessible via one or more networks, such as with a cloud storage service.

The stored information may include video content, such as the content 106 in FIG. 1. The video content may be stored according to one or more compression techniques, such as Moving Pictures Experts Group (MPEG)-2, MPEG-4, etc. In some implementations, raw bits of the video content may be stored. The stored information may also include characteristics of video frames, such as the size, type, location, etc., of the video frames in a GOP. Such information may be used to optimize the coding efficiency of the video frames, as will be described in greater detail below. The stored information may further include information associated with the user devices 240 to facilitate scheduling and distribution of video packets to the user devices 240. Various other information may also, or as an alternative, be stored in the data stores 220 in other examples. The data stores 250 and 280 of the user device 240 and the content provider device 270, respectively, may also store various information to facilitate the functions performed by these devices, as will be described in greater detail below.

Turning to the contents of the memory 222, the memory 222 may include but is not limited to, an operating system (O/S) 224, a scheduler module 226, codec modules 228, and video coding optimization modules 230. Each of these computer program modules may be implemented as individual modules that provide specific functionality associated with optimizing video coding efficiency. Alternatively, one or more of these modules may perform all or at least a portion of the functionality associated with the other modules.

The O/S 224 may be any suitable application or module that controls the general operation of the head end device 210. The O/S 224 may also facilitate the execution of other software modules, for example, the modules shown in the memory 222.

The scheduler module 226 may perform various functions associated with communicating coded video frames, such as video frames that are optimally coded based on characteristics of the content of the video frames (e.g., by the coding optimization module 230 as described in greater detail below). As an example, the scheduler module 226 may receive video data packets from the content provider 270. The video packets may be received in TCP/IP format or any other suitable format readable by the scheduler module 226. The scheduler module 226 may also store coded video frames in respective queues for distribution to user devices 270 at customer premises, in one implementation. The scheduler module 226 may further distribute the coded video packets to the user devices 240. In one implementation, the video packets may be converted from TCP/IP format to RF format for distribution to the user device 240. The scheduler module 226 may perform various other functions to facilitate the processes described herein.

The codec modules 228 may include one or more computer programs capable of encoding and/or decoding digital video, data, or other informational stream or signal. The codec modules 228 may read video or data files stored according to various formats or standards, such as H.265/High Efficiency Video Coding (HEVC) or H.265/HEVC, among others. In certain embodiments herein, the codec modules 228 may be used to code video content, such as the content 106 in FIG. 1, into video frames corresponding to the video content. The efficiency of coding the video content may be optimized (e.g., by the coding optimization module 230 described below) to generate optimized video frames, such as the coded frames 108 in FIG. 1, as will be described in greater detail below.

In one embodiment, the head end device 210 may receive coded video frames from a codec device, which may be a separate device configured to code or decode digital video or data in the same or similar fashion as the codec modules 228.

The coding optimization module 230 may perform functions associated with optimizing video coding efficiency. In so doing, the coding optimization module 230 may determine when to insert intracoded frame into a GOP that includes coded video frames. In one embodiment, the determination may be based at least in part on characteristics of video content. For example, the size of video frames in a sequence of video frames may be compared to determine whether the size change exceeds a threshold. Certain embodiments herein may relate to abrupt size changes and gradual size changes, either of which may result in inserting an intracoded frame in a GOP at the point in the video frame sequence where the size change occurs.

The frame analysis module 232 (e.g., via a scene detection application as described in greater detail below) may determine whether an abrupt size change has occurred. In one embodiment, the frame analysis module 232 may compare the size of a current video frame in a sequence of video frames to a next video frame in the sequence of video frames (or a video frame occurring immediately after the current video frame) to determine whether an abrupt size change has occurred, and hence, that an intracoded video frame should be inserted into a GOP that is optimized according to the techniques described herein.

In one example, an abrupt size change may be determined to exist if the size of a next video frame exceeds the size of the current video frame by a threshold amount or value, which may be predetermined. In one embodiment, the threshold amount may be determined by multiplying a multiplier or factor by the size of the current frame. If the size of the next video frame is greater than or equal to the threshold amount, then an abrupt size change may exist. If the size of the next video frame is less than the threshold amount, then an abrupt size change may not exist. Example multipliers used to determine the threshold amount may be 15.0, 20.0, 25.5, 30.75, or any value or integer.

The frame analysis module 232 may also determine whether a gradual size change has occurred. In one embodiment, the frame analysis module 232 may compare a current video frame in a sequence of video frames to subsequent video frames in the sequence of video frames to determine whether a gradual size change has occurred, and hence, that an intracoded video frame should be inserted into a GOP that is optimized according to the techniques described herein.

In one embodiment, a gradual size change may exist if the size of continuous video frames in a sequence of frames increases from one video frame to the next video frame until the size of one of the continuous video frames exceeds a threshold size or amount. Put another way, a gradual size change may exist if the size of a video frame in a sequence of video frames exceeds a size of a video frame that occurs earlier in the sequence by a threshold amount or value. Such a threshold amount may be determined using a multiplier as described above in association with determining an abrupt size change. In one embodiment, the threshold amount associated with a gradual size change may be relatively lower than the threshold amount associated with an abrupt size change. In one embodiment, a predetermined number of frames in the sequence of video frame sequences (e.g., 5 frames, 20 frames, 40 frames, etc.) may be compared to determine whether a gradual size change exists.

In one example, a first video frame in a sequence of video frames may have a size of 10.0 MB. The size of the next ten video frames may not exceed 30.0 MB, which may be a threshold value that is determined using a threshold value multiplier of 3.0 (e.g., 10.0 MB×3.0). A gradual size change may not be determined at the point of the tenth video frame because, at this point, the size of the frame is less than 30.0 MB and the size of preceding video frames has not exceeded the 30.0 MB threshold value moving along the video frames in the sequence of video frames. The fifteenth video frame, however, may have the first size in the sequence of video frames that exceeds the 30.0 MB threshold value. At the point of the fifteenth video frame, therefore, a gradual size change may be determined. An intracoded frame may be inserted into a GOP in place of the fifteenth video frame in the present example, irrespective of the type of the fifteenth video frame.

Other optimization techniques may include replacing bipredicted frames with unipredicted frames based on characteristics of video frames. For example, the frame analysis module 232 may compare the size of a bipredicted frame to the size of a preceding unipredicted frame to determine whether a unipredicted frame should be coded in place of the bipredicted frame in the GOP. In one embodiment, the unipredicted frame may be coded in place of the bipredicted frame in the GOP if the size of the bipredicted frame increases by a certain amount (e.g., a predetermined amount) over the size of the unipredicted frame.

In other examples, the coding optimization module 230 may insert an intracoded video frame when the size of a video frame exceeds a certain amount irrespective of a preceding or subsequent video frame. The coding optimization module 230 may also insert a unipredicted frame instead of a bipredicted frame if the size of the bipredicted frame exceeds a certain amount (e.g., 50 MB, 500 MB, or any value) and the bipredicted frame succeeds a unipredicted frame. Examples of such comparisons will be described in greater detail below.

In the above embodiments and examples, the size of the video frames may be impacted by various scenes captured in the video frames. Whether a scene change occurred may be determined based at least in part on the size of video frames, in one embodiment. A scene detection application may determine whether a scene change occurred, in one embodiment. A scene change from a scene that has relatively still images to a scene with fast-paced movement, for example, may coincide with an increase in video frame size for the fast-paced movement video frame. In some configurations, more information or content in a video frame may coincide with a relatively higher size. Numerous other examples exist.

Other characteristics of video frames that may be used to optimize video coding efficiency may include the type of frame. As described above, unipredicted frames may be coded in place of bipredicted frames in certain instances based at least in part on whether a current frame is a bipredicted frame and a preceding frame is a unipredicted frame, as a non-limiting example.

In certain embodiments herein, the frame analysis module 232 may include a scene detection application or a scene detector. A scene detector may include software modules or program code that determine scene changes in video content, the type of video frame, the size of the video frame, etc. For example, the scene detector may parse video content, which may be stored in a videofile or other storage resource, and divide the video content into different scenes. In this way, the scene detector may determine scene changes in video content, which may include a sequence of scenes representing continuous action, movement, or other information in the video content.

The information determined by the scene detector may be stored in a location accessible by the frame analysis module 232 and the coding optimization module 230 (e.g., the memory 222 or an external memory). In some embodiments, all or at least a portion of the functionality performed by the scene detector may be performed by the frame analysis module 232 or the coding optimization module 230.

In the manner described above, a GOP in certain embodiments may be open or flexible such that any number of intracoded and/or intercoded frames may be inserted into the GOP, depending on the characteristics of video content. Previous systems may have relied on a fixed GOP in which a predefined number of intracoded and/or intercoded frames are inserted into the GOP. Implementations herein, such as those performed by the coding optimization module 230, may be content and codec agnostic. A determination of whether to insert an intracoded frame or unipredicted frame, as non-limiting examples, may not depend on the type of content (e.g., high-definition content, standard definition content, etc.) or the type of codec used to code video frames. For example, the size and type of video frames, among other characteristics, may be used instead to optimally code video frames as described herein.

The content provider device 270 may provide, among other information, video content to the head end device 210, as described above. In one embodiment, the memory 282 may include one or more provider applications 284 that may implement or facilitate such communication. The content provider device 270 may be associated with television networks, Internet Service Providers (ISPs), or other providers of video, audio, data, or other content.

The user devices 240 may include various devices that facilitate the display of video content. As described above, such devices may include a set-top box, a television, a mobile device, other devices configured to display content, a cable modem, etc. All or a portion of these devices may include one or more content management modules 254, which may reside in the memory 252. The content management modules 254 may configure one or more of the user devices 240 to code or decode digital and/or analog signals carrying video content. In one embodiment, the set-top box may decode video frames coded by the coding optimization module 230 and send the decoded video frames to a television or other display device for presentation on a display of such devices. In other embodiments, a television, a device that includes a combination of set-top box and television components, or other devices, may also decode the video frames. The content management modules 254 may also buffer video content. A set-top box may, for example, buffer video content in a memory (e.g., the memory 252) for a certain period of time before sending the video content to a display device.

The above descriptions in FIG. 2 are for purposes of illustration and are not meant to be limiting. Other embodiments, examples, etc., may exist. For example, any threshold value, multiplier, number of video frames in a sequence of video frames used to evaluate whether a gradual size change occurred, etc., may exist in other examples.

Figure 3:
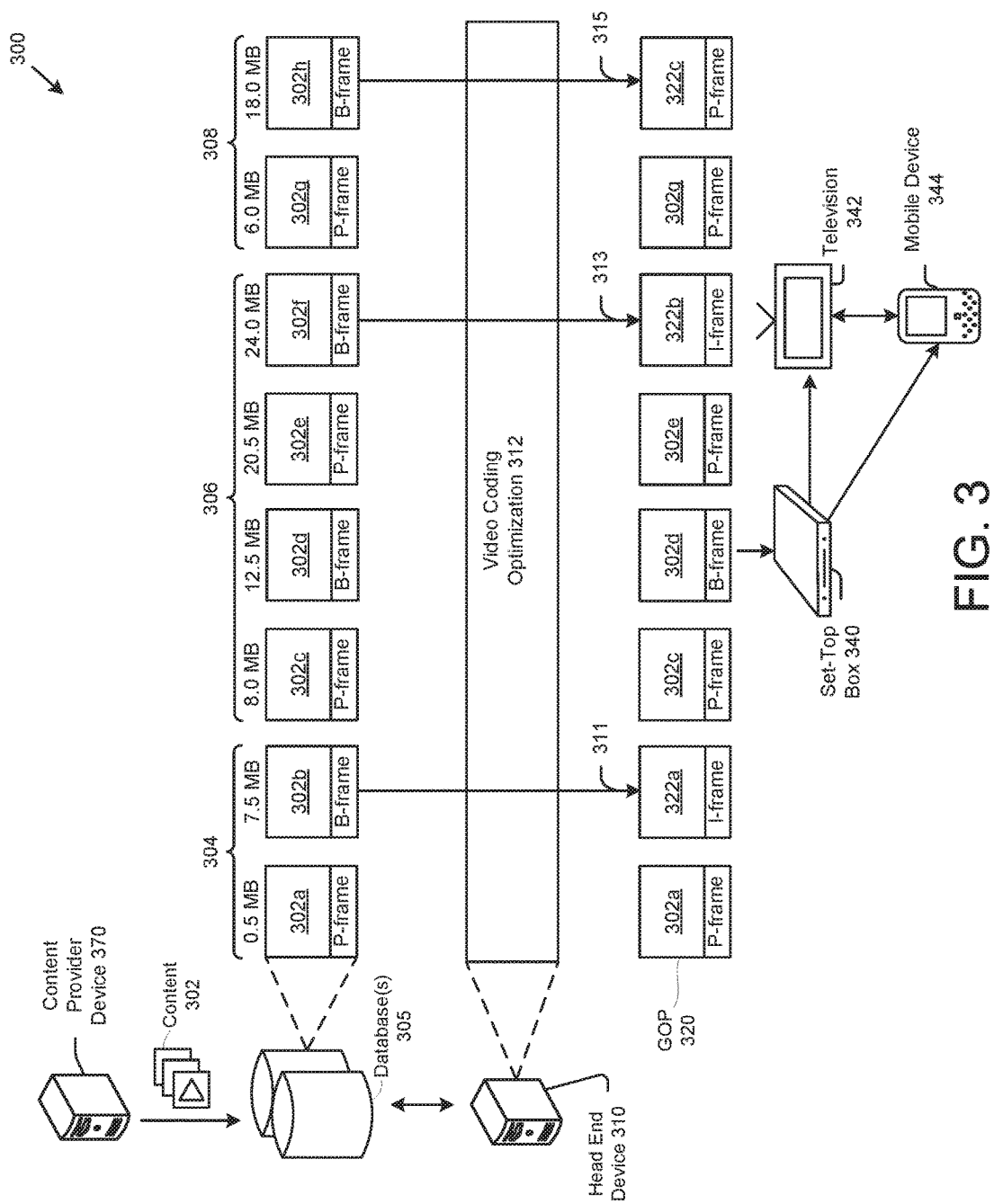
FIG. 3 illustrates a block diagram of an example process for optimizing the coding efficiency of video frames, according to an embodiment of the disclosure.

FIG. 3 depicts a block diagram of an example process for optimizing the coding efficiency of video frames, according to an embodiment of the disclosure. In one embodiment, devices that may implement or facilitate the example process 300 may include, but are not limited to, a head end device 310, a content provider device 370, a set-top box 340, a television 342 and a mobile device 344. The head end device 310 may perform video coding optimization 312, which may be the same or at least similar to the coding optimization module 230 in FIG. 2. Other embodiments may include a different number and type of devices. Further, all or at least a portion of the functions performed by the head end device 310 may also be performed by a video server (not shown), such as the video server 140 in FIG. 1.

The content provider 370 may send video content 302 to the head end device 310. The video content 302 may be stored in one or more databases 305 or other storage. The video content may be stored as raw bits, in one embodiment. In other embodiments, the video content may be stored using various compression formats, such as MPEG-2, MPEG-4, VP 8, VP 9, etc.

The video content may be coded (e.g., via one or more codec modules 228 in FIG. 2) as video frames 302*a-h*, in one embodiment. The coded video frames 302*a-h* may be a sequence of video frames. The sequence of video frames may be included in a GOP, in one embodiment. According to this embodiment, optimizing the coding efficiency of video frames may refer to replacing or otherwise using a different type of video frame (e.g., an intracoded frame, a unipredicted frame, etc.) in the GOP instead of the current video frame in the GOP. In one embodiment, a current video frame type may be deleted prior to inserting a different video frame type. Such deletion and insertion may be part of replacing a video type in one implementation. In this way, a modified GOP that that optimizes coding efficiency may be generated.

In some examples, video frames in a sequence of video frames may be inserted into a GOP. For example, a portion of the video frames in the sequence may not reflect a size increase above a threshold amount, and thus, may be inserted into the GOP without modification of its type. Another portion of the video frames, however, may be modified such that they are optimally coded, for example, when their size increases above a threshold amount.

A sequence of video frames may be stored in a data store, such as one or more databases 305, a memory of the head end device 310, etc. One or more of the video frames 302*a-h* may include different scenes. For example, some of the video frames 302*a-h* may include relatively high-action content, sports content, or similar video content that includes frequently and/or rapidly moving objects. Some of the video frames 302*a-h* may include video content that includes less rapidly moving objects or relatively still objects, such as that which may be found in a talk show program. Any other example types of video content, whether standard definition, high definition, or other content resolutions, may exist.

Each of the video frames 302*a-h* may be a certain type of video frame. For example, video frame 302*a* may be a P-frame; video frame 302*b* may be a B-frame; video frame 302*c* may be a P-frame; and so forth as shown in FIG. 3. While the frames 302*a-h* are expressed as P-frames and B-frames, these frames may also be referred to more generally as unipredicted frames and bipredicted frames, respectively. Other types of unipredicted frames and bipredicted frames, therefore, are not meant to be excluded from this disclosure.

The video frames 302*a-h* may also have a certain size. For example, video frame 302*a* may have a size of 0.5 megabytes (MB); video frame 302*b* may have a size of 7.5 MB; video frame 302*c* may have a size of 8.0 MB; and so forth as shown in FIG. 3. The size of the video frames is for illustrative purposes only and is not meant to be limiting. The video frames 302*a-h* may be any size in other examples. Also, while a certain number of video frames is shown, fewer or more video frames may exist in other examples.

The head end device 310 may code the video frames 302*a-h* in a manner that optimizes video coding efficiency based on the characteristics of the video content. Put another way, the content of the video frames 302*a-h* may be analyzed to determine whether an intracoded video frame should be used instead of one of the video frames 302*a-h* (e.g., a unipredicted frame or a bipredicted frame), and/or whether a unipredicted frame should be used instead of a bipredicted frame. The results of the example optimization may be the video frames 302*a*, 322*a*, 302*c*, 302*d*, 302*e*, 322*b*, 302*g*, and 322*c* shown in the GOP 320.

The size of the video frames 302*a-h* may be compared to one another to determine the type of video frame that should be inserted into the GOP 320. In one example, at least a portion of the video frames 302*a-h* may be compared to determine whether an abrupt size change exists. As described above, an abrupt size change may be determined to exist if the size of a next video frame exceeds the size of the current video frame by a threshold amount, which may be predetermined. In the present example, a multiplier used to determine the threshold amount may be 15.0, although any value may be used in other examples. When comparing the video frame 302*a* to the video frame 302*b* in the comparison 304, therefore, an increase in size from 0.5 MB to 7.5 MB or greater (e.g., 0.5 MB×15.0) may indicate that an intracoded frame should be inserted into the GOP 320 instead of the bipredicted (e.g., B-frame) video frame 302*b*, which is the point in the sequence of video frames 302*a-h* at which the threshold value of 7.5 MB was met or exceeded. As shown by the line 311, an intracoded video frame (e.g., I-frame) 322*a* may be inserted into the GOP 320 instead of the bipredicted video frame 302*b*. The unipredicted (e.g., P-frame) video frame 302*a* may be inserted into the GOP 320 prior to insertion of the intracoded frame 322, as shown.

At least a portion of the video frames 302*a-h* may also be compared to determine whether a gradual size change exists. As described above, a gradual size change may exist if the size of continuous video frames in a sequence of frames increases from one video frame to the next video frame until the size of one of the continuous video frames exceeds a threshold size or amount. Put another way, a gradual size change may exist if the size of a video frame in a sequence of video frames exceeds a size of a video frame that occurs earlier in the sequence by a threshold amount or value. In the present example, a multiplier used to determine the threshold amount may be 3.0, although any value may be used in other examples.

The comparison 306 between the video frames 302*c-f* may be performed to determine whether a gradual size change exists. Although four video frames are used in the comparison, any number of video frames may be compared in other examples. The number of video frames compared (e.g., a maximum number of video frames) may be predetermined, in some embodiments. In one embodiment, a minimum number of video frames (e.g., three, four, etc.) may be required in the comparison to determine whether a gradual size change exists. In this way, a minimum and a maximum number of video frames may be compared to determine whether a gradual size change exists in some embodiments.

In the present example, a determination may be made whether the size of beginning frame 302*c* (e.g., 8.0 MB) increases by a multiplier of 3.0 to meet or exceed the size 24.0 MB (e.g., 8.0 MB×3.0) at or before the video frame 302*f*, and whether each of the continuous video frames 302*c-f* increase in size from video frame 302*c* to 302*d* to 302*e* to 302*f*, in one embodiment. When such conditions are met, a gradual size change may be determined to exist, in one embodiment. An intracoded video frame may be inserted into the GOP 320 instead of the type of video frame in the sequence of video frames 302*c-f* at which the gradual size change threshold value is met or exceeded.

In the present example, a gradual size change may be determined to exist at the bipredicted (B-frame) video frame 302*f* because the size of this frame (e.g., 24.0 MB) meets or exceeds the threshold size of 24.0 MB, which may be determined by multiplying the size of the initial video frame in the comparison 306 (e.g., the video frame 302*c*) by the multiplier of 3.0 in the present example. As a result of the determination, an intracoded (e.g., I-frame) video frame 322*b* may be inserted instead of the video frame 302*f*, as shown by the line 313. The video frames 302*c-e* may be inserted into the GOP 320 without a change in frame type, as shown, because a gradual size change was not determined to exist at the point of these video frames, in the present example.

Another example comparison may include the comparison 308. The comparison 308 may include a comparison between a current unipredicted (e.g., P-frame) video frame 302*g* and a next bipredicted (B-frame) video frame 302*h*. The sizes of such video frames may be compared, in one embodiment. If the size of the next bipredicted video frame increases by a threshold amount over the size of the current video frame, then the bipredicted video frame may be replaced by a unipredicted frame (e.g., P-frame), in one embodiment. In the present example, a multiplier used to determine the threshold amount may be 2.5, although other values may exist in other examples. As shown by the line 315, a unipredicted (e.g., P-frame) video frame 322*c* may be inserted into the GOP 320 as a result of determining that the size of the bipredicted (e.g., B-frame) video frame 302*h* (e.g., 18.0 MB) is greater than the threshold value of 15.0 MB (e.g., 6.0 MB size of the video frame 302*g*×2.5 multiplier).

In the manner described above, the efficiency of coding video frames may be optimized by selectively using intracoded and unipredicted frames based on characteristics of video content, such as the size and type of video frames corresponding to the video content. The GOP 320 may be referred to as open or flexible in the way that intracoded and unipredicted video frames may be inserted in such a manner. The GOP 320 may adhere to a fixed pattern while allowing such insertion of intracoded and unipredicted video frames, in some embodiments.

In some examples, an intracoded frame may be inserted when a new scene is present in video content. The result of inserting an intracoded frame in such instances may be better video compression as compared to a closed GOP, in which a number of intracoded frames may be predetermined and not deterministically inserted into a GOP based on characteristics of video content. By deterministically inserting intracoded frames as described herein, more intercoded frames may be used to improve coding efficiency, and hence, longer GOPs may be used. In such instances, the maximum length of the GOP may be preset because the video quality of intercoded reference frames may be dependent upon the intracoded frames. In other instances, shorter GOPs may be used, for example, for high-action movies, sports, or other video content for which intracoded frames may be inserted more frequently.

The video frames in the GOP 320 may be distributed to one or more user devices, such as the television 342 and the mobile device 344. In one embodiment, the video frames in the GOP 320 (e.g., the video frames 302*a*, 322*a*, 302*c*, 302*d*, 302*e*, 322*b*, 302*g*, and 322*c*) may be encoded on a broadband signal that may be distributed to the set-top box 340, which may decode the coded video frames, buffer and/or store the video frames, and send them to the television 342 and/or the mobile device 344. As described above, various formats may be used to distribute the video frames. In one implementation, video frames stored in the TCP/IP format may be converted to RF format for distribution to one or more user devices.

The above descriptions in FIG. 3 are for purposes of illustration and are not meant to be limiting. Other examples, embodiments, etc., may also exist. For example, any number of video frames in a GOP, threshold values for determining when to insert an intracoded frame or unipredicted frame, user devices that may receive and display video content, etc., may exist in other examples.

Figure 4:
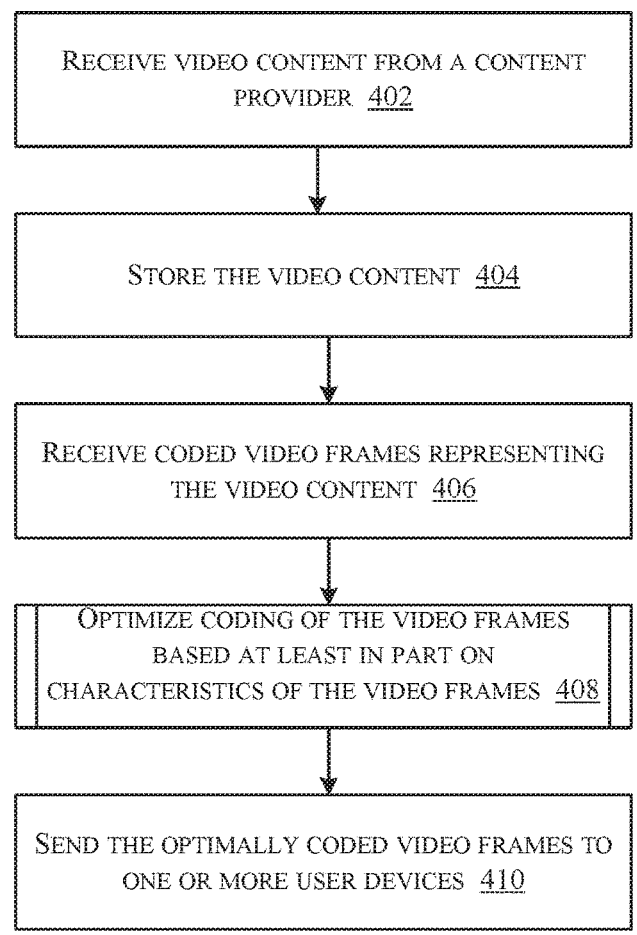
FIG. 4 illustrates a flow diagram of an example process for optimizing video coding efficiency based on characteristics of video content, according to an embodiment of the disclosure.

FIG. 4 depicts a flow diagram of an example process for optimizing video coding efficiency based on characteristics of video content, according to an embodiment of the disclosure. The example process 400 may be implemented by a head end device (e.g., the head end device 210 in FIG. 2) or a video server (e.g., the video server 140 in FIG. 1), which may perform the same or similar functions to the head end device.

The example process 400 may begin at block 402, where video content may be received (e.g. via the scheduler module 226) from a provider of content, such as a television network, an Internet Service Providers (ISP), etc. The video content may be stored at block 404. In one embodiment, the video content may be stored as raw bits to maintain a relatively high resolution, while the video content may be stored in a relatively lower resolution using a compression format such as MPEG-2, MPEG-4, VP 8, VP 9, etc., in other embodiments.

At block 406, video frames may be received (e.g., by the scheduler module 226). The video frames may be coded using various algorithms or techniques to generate intracoded and intercoded frames (e.g., unipredicted and bipredicted frames), as non-limiting examples. In one embodiment, such coded video frames may be generated by a codec application or program modules (e.g., the codec modules 228) and stored in a data store, memory, or other storage. In another embodiment, a codec device may code the video frames and send the coded video frames to the head end device. Other implementations may exist in other examples.

The coding efficiency of the video frames may be optimized (e.g., via the coding optimization module 230) at block 408. In one embodiment, the optimization may be based at least in part on the characteristics of the video frames. Such characteristics may include, but are not limited to, the type of video frame (e.g., intracoded, intercoded, etc.) and the size of the video frame. Processes associated with optimizing the coding efficiency of the video frames are described in greater detail in FIG. 5.

Figure 5:
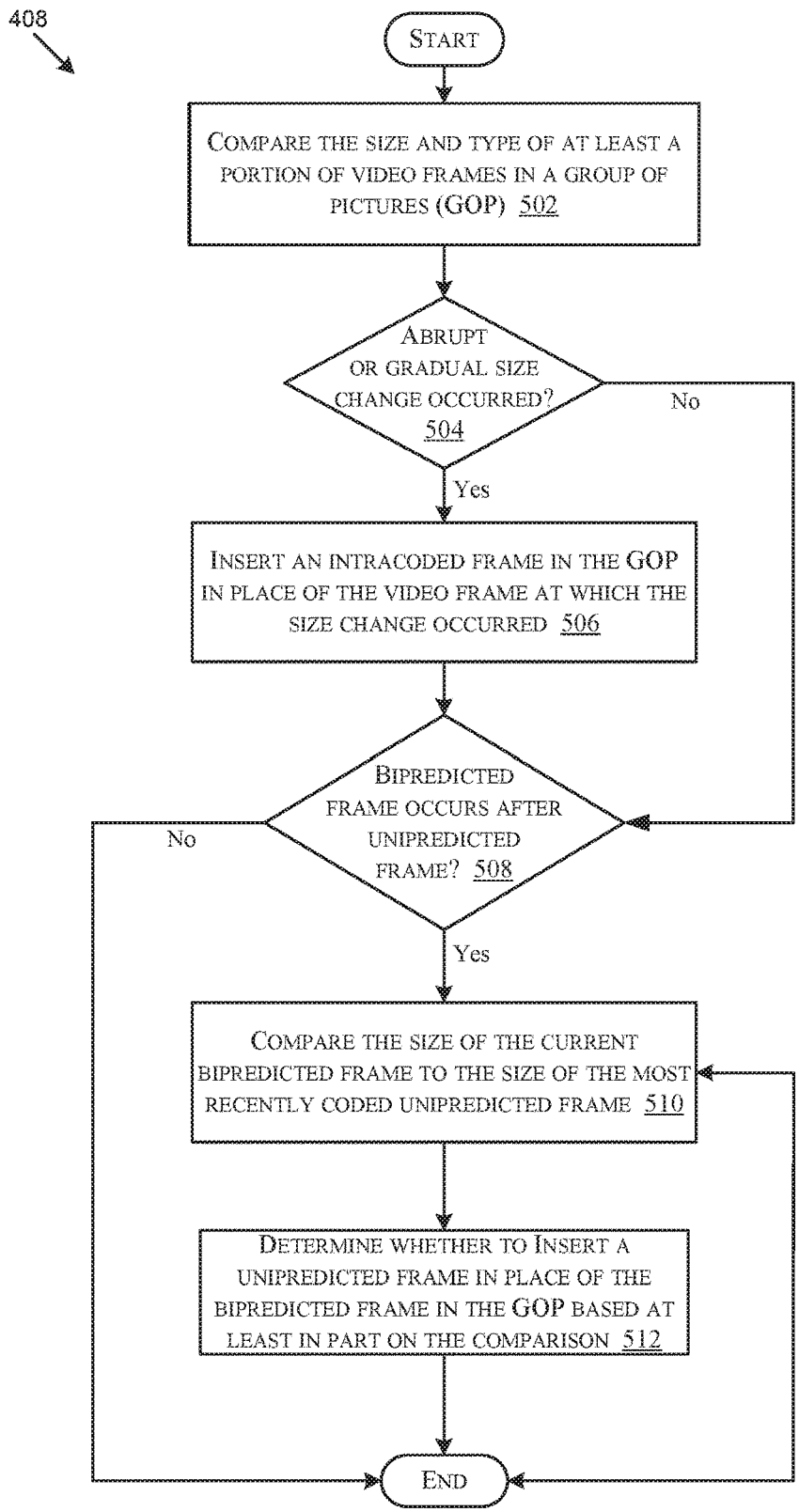
FIG. 5 illustrates a flow diagram of an example process for selectively inserting intracoded frames and/or unipredicted frames to optimize the coding efficiency of video frames, according to an embodiment of the disclosure.

The video frames coded using the optimization technique described in FIG. 5 may be sent to one or more user devices (e.g., the user devices 240 in FIG. 2) at block 410, in one embodiment. For example, video packets in TCP/IP format may be converted to RF format and transmitted via one or more signals to the user devices, where the coded video frames may be decoded and displayed to a user on a television, monitor, or other display. In one embodiment, a set-top box may receive the one or more signals carrying the coded video frames, decode the coded video frames, and buffer the video frames before sending them to a television, mobile device, or other device configured to display video content.

FIG. 5 depicts a flow diagram of an example process for selectively inserting intracoded frames and/or unipredicted frames to optimize the coding efficiency of video frames, according to an embodiment of the disclosure. The example process 408 may be implemented by a head end device (e.g., the head end device 210 in FIG. 2) or a video server (e.g., the video server 140 in FIG. 1). The example process may begin at block 502, where the size of a current video frame may be compared to the size of a subsequent video frame, such as the next frame in a sequence of video frames.

A determination of whether an abrupt or gradual size change occurred may be made at block 504 (e.g., via the frame analysis module 232, which may include a scene detection application). An abrupt size change may occur when the size of a coded video frame increases above a threshold amount with respect to a size of a preceding frame, as described above. A gradual size change may exist if the size of continuous video frames in a sequence of frames increases from one video frame to the next video frame until the size of one of the continuous video frames exceeds a threshold size or amount.

If an abrupt or gradual size change occurred at block 504, then an intracoded video frame may be inserted in the GOP in place of the video frame in the sequence of video frames at which the size change occurred, at block 506.

If an abrupt or gradual size change did not occur at block 504, then additional comparisons may be performed, in one embodiment. For example, a determination maybe made whether a bipredicted frame occurs after a unipredicted frame at block 508. If a bipredicted frame does occur after a unipredicted frame at block 508, then the size of the current bipredicted frame may be compared to the size of the most recently coded unipredicted frame at block 510. In some embodiments, the threshold may be based on a threshold amount. For example, the threshold amount may be based on the size of the unipredicted frame. For example, if the unipredicted frame is 10.0 MB, then a threshold value may be determined by multiplying 10.0 MB by a multiplier of 3.0 to arrive at a threshold amount of 30.0 MB. Any multiplier or threshold may be used in other examples.

A determination may be made whether to insert a unipredicted frame in place of the bipredicted frame in the GOP based at least in part on the comparison at block 512. If the size of the bipredicted frame is greater than the threshold amount (e.g., 30.0 MB in the present example), then a unipredicted frame may be inserted in place of the bipredicted frame in the GOP, in one embodiment. Processing may end after the determination at block 510 or if a bipredicted frame does not occur after a unipredicted frame at block 508.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Further, although specific terms are employed herein, they are used in a generic and descriptive sense only and not for purposes of limitation.

What is claimed is:

1. A system comprising:
    at least one memory that stores computer-executable instructions; and
    at least one processor configured to access the at least one memory, wherein the at least one processor is configured to execute the computer-executable instructions to:
        receive a Group of Pictures (GOP) comprising a sequence of video frames;
        select a portion of video frames in the sequence of video frames;
        identify a second video frame occurring after a first video frame in the portion of video frames;
        determine that a size of the second video frame is greater than a respective size of the first video frame;
        determine a threshold value based at least in part on a multiplication of a multiplier by the respective size of the first video frame;
        determine that the size of the second video frame is greater than or equal to the threshold value;
        determine that a scene change occurred based at least in part on the determination that the size of the second video frame is greater than or equal to the threshold value;
        based at least in part on the determination that the scene change occurred, generate a modified GOP at least in part by replacing the second video frame with an intracoded frame;
        determine that a bipredicted frame occurred after a first unipredicted frame in the sequence of video frames;
        determine that a size of the bipredicted frame is greater than a respective size of the first unipredicted frame; and
        generate a second modified GOP at least in part by replacing the bipredicted frame with a different unipredicted frame;
        generate:
            a compression of the different unipredicted frame based at least in part on data from at least one first frame, of the sequence of frames, proceeding the unipredicted frame, and
            a compression of the bipredicted frame based at least in part on data from at least one second frame, of the sequence of frames, proceeding the bipredicted frame, and data from at least one third frame, of the sequence of frames, after the bipredicted frame.

2. The system of claim 1, wherein the at least one processor is further configured to execute the computer-executable instructions to:
    determine that the portion of video frames comprises a plurality of video frames between the first video frame and the second video frame, wherein a respective size of the plurality of video frames increases from the first video frame to the second video frame.

3. The system of claim 1, wherein the at least one processor is further configured to execute the computer-executable instructions to send the modified GOP to one or more user devices.

4. The system of claim 1, wherein the computer-executable instructions to compare the second size of the second video frame with the first size of the first video frame is further operable to:
    determine that at least one scene change occurred between the first video frame and the second video frame.

5. A method comprising:
    receiving, by a device comprising at least one processor, a Group of Pictures (GOP) comprising a sequence of video frames;
    selecting a portion of the video frames in the sequence of video frames;
    identifying a second video frame occurring after a first video frame in a portion of video frames;
    determining that a size of the second video frame is greater than the first size of the first video frame;
    determining a threshold value based at least in part on a multiplication of a multiplier by the respective size of the first video frame;
    determining that the size of the second video frame is greater than or equal to a threshold value;
    determining that a scene change occurred based at least in part on the determination that the second size of the second video frame greater than or equal to the threshold value;
    based at least in part on the determination that the scene change occurred, generating, by the device, a modified GOP at least in part by replacing the second video frame with an intracoded frame;
    determining that a bipredicted frame occurred after an unipredicted frame in the sequence of video frames;

determining that a size of the bipredicted frame is greater than a respective size of the unipredicted frame; and generating a second modified GOP at least in part by replacing the bipredicted frame with a different unipredicted frame;

generating:
  a compression of the different unipredicted frame is based at least in part on data from at least one frame, of the sequence of frames, proceeding the unipredicted frame, and
  a compression of the bipredicted frame is based at least in part on data from at least one frame, of the sequence of frames, proceeding the bipredicted frame, and data from at least one frame, of the sequence of frames, after the bipredicted frame.

6. The method of claim 5, further comprising:
determining, by the device, that the threshold value is associated with a gradual size change, wherein generating the modified GOP comprises replacing the second video frame with the intracoded frame; and
determining, by the device, that a portion of video frames comprises a plurality of video frames between the first video frame and the second video frame, wherein a respective size of the plurality of video frames increases from the first video frame to the second video frame.

7. The method of claim 5, further comprising:
generating, by the device, the modified GOP at least in part by replacing the second video frame with the unipredicted frame.

8. The method of claim 5, further comprising sending, by the device, the modified GOP to one or more user devices.

9. The method of claim 5, wherein determining that the second size of the second video frame is greater than the first size of the first video frame further comprises determining that at least one scene change occurred between the first video frame and the second video frame.

10. One or more non-transitory computer-readable media storing computer-executable instructions that, when executed by at least one processor, configure the at least one processor to perform operations comprising:
  receiving a Group of Pictures (GOP) comprising a sequence of video frames;
  selecting a portion of the video frames in the sequence of video frames;
  identifying a second video frame occurring after a first video frame in the portion of the video frames;
  determining that a size of the second video frame with a respective size of the first video frame;
  determining a threshold value based at least in part on a multiplication of a multiplier by the respective size of the first video frame;
  determining that the size of the second video frame is greater than or equal to a threshold value;
  determining that a scene change occurred based at least in part on the determination that the second size of the second video frame greater than or equal to the threshold value;

based at least in part on the determination that the scene change occurred, generating, by the device, a modified GOP at least in part by replacing the second video frame with an intracoded frames;

determining that a bipredicted frame occurred after an unipredicted frame in the sequence of video frames;

determining that a size of the bipredicted frame is greater than a respective size of the unipredicted frame; and generating a second modified GOP at least in part by replacing the bipredicted frame with a different unipredicted frame;

generating:
  a compression of the different unipredicted frame is based at least in part on data from at least one frame, of the sequence of frames, proceeding the unipredicted frame, and
  a compression of the bipredicted frame is based at least in part on data from at least one frame, of the sequence of frames, proceeding the bipredicted frame, and data from at least one frame, of the sequence of frames, after the bipredicted frame.

11. The one or more non-transitory computer-readable media of claim 10, wherein the at least one processor is further configured to execute the computer-executable instructions to perform the operations comprising:
  determining that the threshold value is associated with a gradual size change, wherein generating the modified GOP comprises replacing the second video frame with the intracoded frame; and
  determining that a portion of video frames comprises a plurality of video frames between the first video frame and the second video frame, wherein a respective size of the plurality of video frames increases from the first video frame to the second video frame.

12. The one or more non-transitory computer-readable media of claim 10, wherein the at least one processor is further configured to execute the computer-executable instructions to perform the operations comprising:
  generating the modified GOP at least in part by replacing the second video frame with the unipredicted frame.

13. The one or more non-transitory computer-readable media of claim 10, wherein the at least one processor is further configured to execute the computer-executable instructions to perform the operation comprising sending the modified GOP to one or more user devices.

14. The one or more non-transitory computer-readable media of claim 10, wherein the computer-executable instructions operable to determine that the second size of the second video frame is greater than the first size of the first video frame are further operable to determining that at least one scene change occurred between the first video frame and the second video frame.

15. The system of claim 1, wherein the at least one processor is further configured to execute the computer-executable instructions to:
  generate the modified GOP by replacing the second video frame with the unipredicted frame.

* * * * *